United States Patent
Toyama et al.

(10) Patent No.: US 11,028,186 B2
(45) Date of Patent: Jun. 8, 2021

(54) CELLULOSE DERIVATIVE, CELLULOSE RESIN COMPOSITION, MOLDED BODY AND PRODUCT USING SAME

(71) Applicant: NEC CORPORATION, Tokyo (JP)

(72) Inventors: Kiyohiko Toyama, Tokyo (JP); Masatoshi Iji, Tokyo (JP); Midori Shimura, Tokyo (JP); Shukichi Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 90 days.

(21) Appl. No.: 16/309,989

(22) PCT Filed: Jun. 15, 2017

(86) PCT No.: PCT/JP2017/022177
§ 371 (c)(1),
(2) Date: Dec. 14, 2018

(87) PCT Pub. No.: WO2017/217502
PCT Pub. Date: Dec. 21, 2017

(65) Prior Publication Data
US 2019/0330379 A1    Oct. 31, 2019

(30) Foreign Application Priority Data
Jun. 17, 2016 (JP) .............................. JP2016-121282

(51) Int. Cl.
*C08B 3/16* (2006.01)
*C08K 3/04* (2006.01)

(52) U.S. Cl.
CPC .................. *C08B 3/16* (2013.01); *C08K 3/04* (2013.01); *C08K 2201/005* (2013.01)

(58) Field of Classification Search
None
See application file for complete search history.

(56) References Cited

U.S. PATENT DOCUMENTS

| | | | | | |
|---|---|---|---|---|---|
| 3,978,019 | A | * | 8/1976 | Oelmann | ................. C09C 1/48 524/496 |
| 6,136,286 | A | * | 10/2000 | Okuyama | ................. C09C 1/56 423/449.1 |
| 2009/0214865 | A1 | * | 8/2009 | Uchida | ................... C09D 7/68 428/402 |
| 2013/0085213 | A1 | * | 4/2013 | Imanishi | ............... C08K 5/527 524/40 |
| 2014/0194617 | A1 | | 7/2014 | Boday et al. | |

FOREIGN PATENT DOCUMENTS

| | | | |
|---|---|---|---|
| JP | 02-006501 A | 1/1990 | |
| JP | 04-501428 A | 3/1992 | |
| JP | 2005-132970 A | 5/2005 | |
| JP | 2005-194302 A | 7/2005 | |
| JP | 2006-111858 A | 4/2006 | |
| JP | 2007-291216 A | 11/2007 | |
| JP | 2009-056713 A | 3/2009 | |
| JP | 2010-031230 A | 2/2010 | |
| JP | 2010-084028 A | 4/2010 | |
| JP | 2010-121121 A | 6/2010 | |
| JP | 2011-132457 A | 7/2011 | |
| JP | 2012-036326 A | 2/2012 | |
| JP | 2012-211253 A | 11/2012 | |
| JP | 2012-241055 A | 12/2012 | |
| JP | 2013-112781 A | 6/2013 | |
| JP | 2015-172150 A | 10/2015 | |
| JP | 2016-023274 A | 2/2016 | |
| KR | 10-2015-0050267 A | 5/2015 | |
| KR | 20150050267 A | * 5/2015 | ............. C08B 11/00 |
| WO | 2011/043279 A1 | 4/2011 | |
| WO | 2012/017772 A1 | 2/2012 | |
| WO | 2013/147143 A1 | 10/2013 | |

OTHER PUBLICATIONS

KR20150050267 English Machine Translation, prepared May 7, 2020. (Year: 2020).*
International Search Report for PCT/JP2017/022177, dated Jul. 18, 2017.

* cited by examiner

*Primary Examiner* — Christopher M Rodd
(74) *Attorney, Agent, or Firm* — Sughrue Mion, PLLC

(57) ABSTRACT

A cellulose derivative obtained by substituting at least part of hydrogen atoms of hydroxy groups of a cellulose with an acyl group having 2 to 4 carbon atoms, a long-chain organic group having 7 or more carbon atoms and a high refractive-index organic group.

13 Claims, No Drawings

CELLULOSE DERIVATIVE, CELLULOSE RESIN COMPOSITION, MOLDED BODY AND PRODUCT USING SAME

CROSS REFERENCE TO RELATED APPLICATIONS

This Application is a National Stage of International Application No. PCT/JP2017/022177 filed Jun. 15, 2017, claiming priority based on Japanese Patent Application No. 2016-121282 filed Jun. 17, 2016, and the entire disclosure of which is incorporated herein by reference.

TECHNICAL FIELD

The present invention relates to a cellulose derivative, a cellulose resin composition, a molded body formed of the resin composition and a product using the molded body.

BACKGROUND ART

Bioplastic using a plant as a raw material can contribute to a countermeasure against petroleum depletion and global warming and has been started being used not only in common products such as packaging, containers and fibers but also in durable products such as electronics and automobiles.

However, general bioplastics, such as polylactic acid, polyhydroxyalkanoate and modified starch, all use starch materials, more precisely, edible parts, as raw materials. Accordingly, for fear of future food shortage, it has been desired to develop a novel bioplastic using a non-edible part as a raw material.

As a raw material of a non-edible part, cellulose which is a main component of wood and plant is representative, and various types of bioplastics using the cellulose have been already developed and commercialized.

For example, Patent Literature 1 describes a resin composition containing a cellulose resin and a phosphazene compound, the content of which is 5 to 300% by mass relative to the cellulose resin. The literature states that a molded body obtained by molding the resin composition is excellent in hygrothermal resistance.

Patent Literature 2 describes a resin composition constituted of a cellulose ester (cellulose acetate) having the average substitution degree of 2.7 or less, a phosphoric acid ester as a plasticizer and a filler. The literature states that such a resin composition is small in environment load and excellent in flowability; and that a molded body obtained by molding the resin composition has satisfactory rigidity, dimensional accuracy and flame retardance.

Patent Literature 3 describes a resin composition containing a cellulose resin, a non-cellulose thermoplastic resin (a thermoplastic resin having an aromatic ring such as an aromatic polycarbonate resin) and a fluorene compound having a 9,9-bisarylfluorene skeleton. The literature states that such a resin composition can improve formability or processability. The literature also states that since the fluorene compound forms into a complex, a cellulose resin composition excellent in properties such as transparency, heat-resistance, water resistance and surface hardness can be obtained.

Additionally, Patent Literature 4 describes a cellulose derivative produced by substituting at least a part of hydrogen atoms of hydroxy groups of a cellulose with a short-chain acyl group (for example, an aliphatic acyl group having 2 to 4 carbon atoms) and a long-chain acyl group (for example, an aliphatic acyl group having 5 to 20 carbon atoms), and that the cellulose derivative has a low water absorption rate, satisfactory thermoplasticity, strength and fracture elongation and is suitable for molding process.

Patent Literature 5 describes a cellulose derivative having cardanol introduced therein; and that other organic groups are introduced in addition to cardanol. The literature also states that these cellulose derivatives were improved in thermoplasticity, mechanical characteristics and water resistance.

Patent Literature 6 describes a cellulose derivative produced by substituting at least part of hydrogen atoms of hydroxy groups contained in a cellulose with a hydrocarbon group and an aliphatic carbonate group or an aromatic carbonate group. The literature states that such a cellulose derivative is excellent in thermoplasticity and thus can be formed into a molded body, and that the molded body has satisfactory impact resistance and fracture elongation and thus can be suitably used in housing for electronic devices.

On another front, it has been recently desired to develop a resin molding having high external-appearance quality without coating. If a resin molding is not coated, cost for discharging volatile organic compounds (VOC) during a production process and coating cost can be saved. As for the molding obtained, a negative change in appearance caused by removal and degradation of coating can be overcome.

For example, Patent Literature 7 describes a thermoplastic resin composition containing a graft copolymer formed of a rubber polymer, a copolymer formed of a predetermined vinyl monomer, a predetermined polyester, and carbon black and/or a dye serving as a colorant in a predetermined ratio. The literature also states that an injection molding obtained by injection-molding the composition has high impact resistance and high external-appearance quality (glossy and jet-black color).

Patent Literature 8 describes a black resin composition containing a predetermined copolymerized polycarbonate resin, a colorant (carbon black and/or black organic dye) and a hindered amine based stabilizer and having specific properties (pencil hardness, low-temperature impact resistance, brittle fracture rate, glossiness, brightness). The literature also states that the black molding of the black resin composition has an excellent jet-black color and excellent low-temperature impact resistance, weather resistance, abrasion-resistance and heat-resistance.

Patent Literature 9 describes a black resin composition containing a predetermined copolymerized polycarbonate resin, a styrene resin, an impact modifier (rubber-modified resin) and carbon black in a predetermined blending ratio. The literature also states that a molding of the black resin composition has excellent jet-black color and excellent impact resistance, flowability, abrasion-resistance and heat-resistance.

Patent Literature 10 describes a thermoplastic resin composition containing a predetermined graft copolymer (1 to 99 parts by mass), a vinyl copolymer (99 to 1 part by mass), and other thermoplastic resins (0 to 80 parts by mass) and also containing a predetermined organic dye. The literature also states that a molded body of the composition is excellent in impact resistance, weather resistance, jet-black color, surface smoothness and abrasion-resistance. The literature also states that the thermoplastic resin composition of Comparative Example 3, which contains a pigment (carbon black: Mitsubishi carbon #2600 (trade name) manufactured by Mitsubishi Chemical Corporation) in place of an organic dye, is unsatisfactory in jet-black color and surface smoothness.

CITATION LIST

Patent Literature

Patent Literature 1: JP2012-36326A
Patent Literature 2: JP2005-194302A
Patent Literature 3: JP2012-211253A
Patent Literature 4: JP2010-121121A
Patent Literature 5: WO2011/043279
Patent Literature 6: JP2010-84028A
Patent Literature 7: WO2013/147143
Patent Literature 8: JP2015-172150A
Patent Literature 9: JP2013-112781A
Patent Literature 10: JP2005-132970A

SUMMARY OF INVENTION

Technical Problem

An object of the present invention is to provide a cellulose derivative, from which a molded body having high external-appearance quality can be formed, a cellulose resin composition, a molded body formed of the resin composition and a product using the molded body.

Solution to Problem

According to an aspect of the present invention, there is provided a cellulose derivative obtained by substituting at least part of hydrogen atoms of hydroxy groups of a cellulose with an acyl group having 2 to 4 carbon atoms (short-chain organic group), a long-chain organic group having 7 or more carbon atoms and a high refractive-index organic group.

According to another aspect of the present invention, there is provided a cellulose resin composition containing the above cellulose resin.

According to another aspect of the present invention, there is provided a molded body formed of the above cellulose resin composition.

According to another aspect of the present invention, there is provided a product using the above molded body.

Advantageous Effects of Invention

According to exemplary embodiments, it is possible to provide a cellulose derivative, from which a molded body having high external-appearance quality can be formed, a cellulose resin composition, a molded body formed of the resin composition and a product using the molded body.

DESCRIPTION OF EMBODIMENTS

Now, the exemplary embodiments will be described below.

A cellulose derivative according to an exemplary embodiment is obtained by substituting at least part of hydrogen atoms of hydroxy groups of a cellulose with an acyl group having 2 to 4 carbon atoms (short-chain organic group), a long-chain organic group having 7 or more carbon atoms and a high refractive-index organic group.

It is preferable that the high refractive-index organic group is a group having an aromatic ring.

It is preferable that an acetyl group or/and a propionyl group are used as the short-chain acyl group. It is also preferable that the long-chain organic group is a linear saturated aliphatic acyl group having 14 to 30 carbon atoms.

A cellulose resin composition according to another exemplary embodiment contains the aforementioned cellulose derivative and a colorant. The content of the colorant relative to the total of the cellulose resin composition preferably falls within the range of 0.05 to 10% by mass.

As the colorant, various inorganic or organic pigments or dyes corresponding to desired color phases such as black, white, yellow, orange, red, purple, blue and green can be used. Also a plurality of colorants may be used in combination.

A molded body having high external-appearance quality can be formed by using the cellulose resin composition according to the exemplary embodiment. As the glossiness of the molded body increases, higher external-appearance quality can be obtained.

When high external-appearance quality due to jet-black color is desired, the colorant to be used is preferably a carbon black and more preferably an acidic carbon black. It is preferable that the pH of the acidic carbon black is 5 or less, and that the average particle diameter of the carbon black falls within the range of 1 to 20 nm.

The molded body using a cellulose resin composition containing a carbon black can obtain higher external-appearance quality as the glossiness thereof increases and the brightness thereof decreases. In this case, as the brightness decreases, the quality of jet-black color increases.

The cellulose resin composition may contain a high refractive-index organic material. It is preferable that the content of the high refractive-index organic material relative to 100 parts by mass of the cellulose derivative is 0 to 100 parts by mass.

It is preferable that the total content of the cellulose derivative and the high refractive-index organic material relative to the amount of the cellulose resin composition excluding the colorant is 90% by mass or more.

Now, the exemplary embodiments will be more specifically described below.

(Cellulose Derivative)

A cellulose derivative (cellulose resin) contained in a cellulose resin composition according to the exemplary embodiment is obtained by substituting at least part of hydrogen atoms of hydroxy groups of a cellulose with a short-chain acyl group having 2 to 4 carbon atoms, a long-chain organic group having 7 or more carbon atoms and a high refractive-index organic group.

<Cellulose>

Cellulose is a straight-chain polymer obtained by polymerizing β-D-glucose molecules (β-D-glucopyranose) represented by the following formula (1) via a β (1→4) glycoside bond. Each of the glucose units constituting a cellulose has three hydroxy groups (where n represents a natural number). In the exemplary embodiment, an organic group such as an acyl group is introduced into the cellulose by using these hydroxy groups.

[Formula 1]

$$\left[ \begin{array}{c} \text{(cellulose structure)} \end{array} \right]_n \quad (1)$$

Cellulose is a main component of a plant and can be obtained by a separation treatment for removing other components such as lignin from a plant. Other than those thus obtained, cotton (for example, cotton linters) having a high cellulose content and pulp (for example, wood pulp) can be used directly or after they are purified. As the shape, size and form of the cellulose or a derivative thereof to be used as a raw material, a powder form cellulose or a derivative thereof having an appropriate particle size and particle shape is preferably used in view of reactivity, solid-liquid separation and handling. For example, a fibrous or powdery cellulose or a derivative thereof having a diameter of 1 to 100 μm (preferably 10 to 50 μm) and a length of 10 μm to 100 mm (preferably 100 μm to 10 mm) can be used.

The polymerization degree of a cellulose in terms of polymerization degree (average polymerization degree) of glucose preferably falls within the range of 50 to 5000, more preferably 100 to 3000 and further preferably 500 to 3000. If the polymerization degree is extremely low, the strength and heat resistance of the produced resin may not be sufficient in some cases. Conversely, if the polymerization degree is extremely high, the melt viscosity of the produced resin is extremely high, interfering with molding in some cases.

<High Refractive-Index Organic Group>

The high refractive-index organic group of a cellulose derivative (cellulose resin) in the exemplary embodiment can be introduced by use of a hydroxy group of a cellulose.

Examples of the high refractive-index organic group include an aromatic ring; a nitrogen atom-containing groups such as a triazine group; phosphorus atom-containing groups such as a phosphoric acid group ($PO_4$ group) and a phosphazene group; sulfur atom-containing groups such as a sulfonyl ($SO_2$) group, a sulfide group (—S—) and a disulfide group (—S—S—); a halogen group (Cl, Br, I) except fluorine; an alicyclic group; and a group having an organic metal portion.

The high refractive-index organic group and a pyranose ring of a cellulose can be bound via, e.g., an ester bond, an ether bond, a urethane bond or a carbonate bond.

The binding amount of the high refractive-index organic group is preferably 0.05 or more, more preferably 0.1 or more, further preferably, 0.2 or more and particularly preferably 0.3 or more in terms of the substitution degree of the OH groups (hydroxy groups) of a cellulose, in order to obtain high external-appearance quality by increasing glossiness of a molding. In contrast, in view of flexibility and flowability of a resin, the binding amount is preferably 2.0 or less, more preferably 1.5 or less, further preferably 1.0 or less and particularly preferably 0.5 or less.

The binding amount of the high refractive-index organic group herein is represented by the average number of high refractive-index organic groups introduced per glucose unit of a cellulose (DS) (introduction ratio of a high refractive-index organic group), in other words, the average number of hydroxy groups (OH groups) substituted with high refractive-index organic groups per glucose unit (hydroxy group substitution degree).

As the high refractive-index organic group, an organic group containing an aromatic ring is preferable, and particularly, an aromatic acyl group and an aromatic phosphoric acid ester group are preferable.

The "aromatic ring" of the high refractive-index organic group can be present within a molecule structure of a compound as an aromatic ring group (aromatic group). Examples of the aromatic ring include, but are not limited to, a benzene ring and a naphthalene ring, which each provide an aryl group; and a furan ring, a thiophene ring, a pyrrole ring, an imidazole ring and a pyridine ring, which each provide a heteroaryl group. Examples of the aryl group include a phenyl group, which is derived from a benzene ring as an aromatic ring; and a 1-naphthyl group and 2-naphthyl group, which are each derived from a naphthalene ring as an aromatic ring. The heteroaryl group is a heteroaromatic ring group containing one or more hetero atoms. Examples of the hetero atoms include oxygen atom, nitrogen atom and sulfur atom. The heteroaryl group preferably has 5 or 6 ring atoms including a hetero atom. Specific examples of the heteroaryl group include a furyl group, a thienyl group, a pyrrolyl group, an imidazolyl group and a pyridyl group.

The aromatic ring group may be substituted. In the case where the aromatic ring group is "substituted", examples of a substituent include, but are not limited to, a hydroxy group; a halogen atom (for example, a fluorine atom, a chlorine atom, a bromine atom and an iodine atom); an amino group; a mono or dialkylamino group (for example, a dimethylamino group, a diethylamino group and a dibutylamino group); a nitro group; a cyano group; an alkyl group (for example, a C1-8 alkyl group), a C1-8 alkoxy group (for example, a methoxy group, an ethoxy group, an isopropoxy group); and a C3-8 cycloalkyl group.

Examples of the aromatic acyl group include mononuclear (monocyclic) groups such as a benzoyl group, a phenylacetyl group, a phenylpropionyl group, a phenylbutyryl group and a cinnamic acid ester group; and multinuclear (polycyclic) groups such as a diphenylacetyl group, a biphenylacetyl group, a 4-phenylbenzoyl group, a 4-benzoyloxyphenylacetyl group and a naphthoyl group. In the aromatic rings thereof, a substituent (for example, an alkyl group having 1 to 3 carbon atoms) other than an acyl group may be further present.

Of the aromatic acyl groups, a 3-phenylpropionyl group represented by the following formula or a derivative group thereof is preferable. As the derivative group, an aromatic ring (in the formula, Ph: phenyl group) having an alkyl group having 1 to 3 carbon atoms is mentioned.

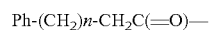

where n represents an integer of 0 to 4.

The aromatic acyl group represented by the above formula where n is 1 can be represented by the following formula:

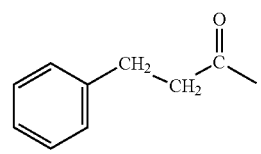

[Formula 2]

As shown in the above formula, the aromatic acyl group preferably contains an alkylene group such as a methylene group between the aromatic ring and the carbonyl group in view of reactivity. In view of flowability, the number of methylene groups is preferably one or more (n in the formula is 0 or more) and more preferably two or more (n in the formula is 1 or more). In order to increase the refractive index of a cellulose resin, the number of methylene groups is preferably 5 or less (n in the formula is 4 or less) and more preferably 3 or less (n in the formula is 2 or less).

Examples of the aromatic phosphoric acid ester group include mononuclear (monocyclic) groups such as a phenyl phosphoric acid ester group; and multinuclear (polycyclic) groups such as a diphenyl phosphoric acid ester group, and a naphthyl phosphoric acid ester group. In the aromatic rings thereof, a substituent (for example, an alkyl group having 1 to 3 carbon atoms) other than an acyl group may be present.

Of the aromatic phosphoric acid ester groups, a diphenyl phosphoric acid ester group represented by the following formula or a derivative group thereof is preferable. As the derivative group, those in which at least one aromatic ring has an alkyl group having 1 to 3 carbon atoms are mentioned.

[Formula 3]

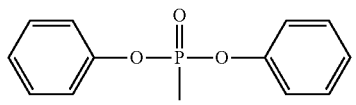

If a high refractive-index organic group has an aromatic ring, the mass fraction of the aromatic ring to the high refractive-index group is preferably 30% by mass or more, more preferably 40% by mass or more and further preferably 50% by mass or more, in order to exhibit a high refractive index. In contrast, in view of flowability and flexibility of a resin, the mass fraction of the above aromatic ring is preferably 80% by mass or less, preferably 70% by mass or less and further preferably 60% by mass or less. In calculating the mass fraction, the mass of the aromatic ring is defined as a total mass of carbon atoms constituting the aromatic ring of the high refractive-index group. The mass of the high refractive-index group refers to the mass of the portion of the high refractive-index group except a cellulose residue, to which the high refractive-index group is bound (an oxygen atom constituting a hydroxy group and involved in binding is not included and the atom bound to the oxygen atom is included).

The mass fraction of an aromatic ring portion in the cellulose derivative, which is not particularly limited, is preferably 3% by mass or more, more preferably 5% by mass and further preferably 7% by mass or more in order to obtain high external-appearance quality by increasing glossiness of a molding. In contrast, in view of flexibility and flowability of a resin, the mass fraction is preferably 30% by mass or less, more preferably 20% by mass or less and further preferably 15% by mass or less. In calculating the mass fraction, the mass of the aromatic ring portion is defined as the total mass of carbon atoms constituting the aromatic ring.

The high refractive-index organic group can be introduced by the reaction between a reactant which contains a functional group reactive to a hydroxy group of a cellulose and a high refractive-index organic group and a hydroxy group of a cellulose or a derivative thereof.

If an aromatic acyl group is introduced, for example, an acid halide or acid anhydride of the aromatic carboxylic acid corresponding to an aromatic acyl group, can be used.

If an aromatic phosphoric acid ester group is introduced, for example, a halide of an aromatic phosphate (for example, a chloride obtained by substituting one of the organic group portions containing oxygen atoms of an aromatic triphosphate with e.g., Cl) can be used.

A high refractive-index group can be introduced by the reaction between the reactant and a cellulose derivative (short-chain/long-chain bound cellulose derivative), in which an acyl group having 1 to 4 carbon atoms (short-chain organic group) and a long-chain organic group having 7 or more carbon atoms are introduced; alternatively, by the reaction between the reactant and a cellulose derivative (short-chain bound cellulose derivative) having a short-chain organic group introduced therein; and a long-chain organic group can be introduced simultaneously with or after the reaction. Further alternatively, a high refractive-index organic group may be introduced by the reaction between the reactant and a cellulose. In this case, a short-chain organic group and a long-chain organic group may be introduced simultaneously with or after the reaction to form a desired cellulose derivative.

<Long-Chain Organic Group>

The long-chain organic group of a cellulose derivative (cellulose resin) in the exemplary embodiment can be introduced by use of a hydroxy group of a cellulose.

A long-chain organic group can be introduced by reacting a hydroxy group of a cellulose with a long-chain reactant. The long-chain organic group corresponds to the organic group portion introduced in place of a hydrogen atom of a hydroxy group of a cellulose. The long-chain organic group can bind to the pyranose ring of a cellulose via, e.g., an ester bond, an ether bond, a urethane bond or a carbonate bond.

As the long-chain organic group, a long-chain organic group having 7 or more carbon atoms can be used. The long-chain organic group having 12 or more carbon atoms is preferable; the long-chain organic group having 14 or more carbon atoms is more preferable; and the long-chain organic group having 16 or more carbon atoms is particularly preferable. In view of reaction efficiency at the time of introducing a long-chain component, the long-chain organic group having 48 or less carbon atoms is preferable, the long-chain organic group having 36 or less carbon atoms is more preferable; and the long-chain organic group having 24 or less carbon atoms is particularly preferable. As the long-chain organic group, a single type or two types or more long-chain organic groups may be used.

As the long-chain organic group, for example, a linear saturated aliphatic acyl group having 7 or more carbon atoms is mentioned. A linear saturated aliphatic acyl group having 7 to 30 carbon atoms is preferable; a linear saturated aliphatic acyl group having 14 to 22 carbon atoms is more preferable; groups (tetradecanoyl group, hexadecanoyl group, octadecanoyl group, icosanoyl group and docosanoyl group) obtained by removing OH from carboxyl groups of myristic acid, palmitic acid, stearic acid, arachidic acid and behenic acid are further preferable.

The long-chain reactant is a compound having at least one functional group reactive to a hydroxy group of a cellulose. If the binding portion is an ester bond, a compound having a carboxyl group, a carboxylic halide group or a carboxylic anhydride group can be used as the long-chain reactant. If the binding portion is an ether bond, a compound having an epoxy group or a halogen group can be used as the long-chain reactant. If the binding portion is a urethane bond, a compound having an isocyanate group can be used as the long-chain reactant. If the binding portion is a carbonate bond, a compound having a chloroformate group can be used as the long-chain reactant.

The long-chain reactant may further contain, other than the above functional groups, an ester bond, an ether bond, a urethane bond, a carbonate bond and an amide bond in the molecule structure. The long-chain reactant may further contain at least one structure selected from a linear hydrocarbon, an aromatic hydrocarbon, an alicyclic hydrocarbon or these structures in combination.

As the long-chain reactant, for example, a long-chain carboxylic acid having 7 or more carbon atoms and an acid halide or an acid anhydride of the long-chain carboxylic acid can be used. The unsaturation degrees and positions of unsaturated bonds of these carboxylic acids or carboxylic acid derivatives may be arbitrary. The saturation degrees of these carboxylic acids or carboxylic acid derivatives are preferably as high as possible and a linear saturated fatty acid and an acid halide or anhydride thereof are preferable.

Specific examples of the long-chain carboxylic acid include linear saturated fatty acids such as enanthic acid, caprylic acid, pelargonic acid, capric acid, lauric acid, myristic acid, pentadecylic acid, palmitic acid, margaric acid, stearic acid, arachidic acid, behenic acid, lignoceric acid, cerotic acid, montanic acid and melissic acid; and myristic acid, palmitic acid, stearic acid, arachidic acid and behenic acid are preferable. Furthermore, in view of environmental harmony, a carboxylic acid obtained from a natural product is preferable as the long-chain carboxylic acid.

The long-chain organic group can be formed by binding a compound whose direct reactivity to a hydroxy group of a cellulose is not high, such as a hydroxy compound, to a cellulose by use of a multifunctional compound. For example, a multifunctional compound and a hydroxy compound are bound by use of a hydroxy group of the hydroxy compound and a functional group of the multifunctional compound, and then, the resultant derivative of the hydroxy compound can be bound to a cellulose by use of the hydroxy group of the cellulose and a functional group derived from the multifunctional compound. As the hydroxy compound, an alcohol and a phenol can be mentioned. For example, cardanol or a derivative thereof (e.g., a derivative obtained by hydrogenating an unsaturated bond of the linear hydrocarbon portion of cardanol and a derivative obtained by hydrogenating the aromatic ring of the phenol portion of cardanol and converting it into a cyclohexane ring) is mentioned.

The above multifunctional compound preferably contains a hydrocarbon group. The number of carbon atoms of the hydrocarbon group is preferably 1 or more and more preferably 2 or more; and preferably 20 or less, more preferably 14 or less and further preferably 8 or less. If the number of carbon atoms is excessively large, the size of the molecule becomes extremely large and the reactivity decreases. Consequently, in some cases, it becomes difficult to raise the reaction rate. Such a hydrocarbon group, a bivalent group is preferable. Examples thereof include bivalent linear aliphatic hydrocarbon groups (particularly, linear alkylene groups) such as a methylene group, an ethylene group, a propylene group, a butylene group, a pentamethylene group, a hexamethylene group, a heptamethylene group, an octamethylene group, a decamethylene group, a dodecamethylene group and a hexadecamethylene group; bivalent alicyclic hydrocarbon groups such as a cycloheptane ring, a cyclohexane ring, a cyclooctane ring, a bicyclopentane ring, a tricyclohexane ring, a bicyclooctane ring, a bicyclononane ring and a tricyclodecane ring; bivalent aromatic hydrocarbon groups such as a benzene ring, a naphthalene ring and a biphenylene group; and bivalent groups including these in combination.

The functional groups of the above multifunctional compound are preferably groups selected from a carboxyl group, a carboxylic anhydride group, a carboxylic halide group (particularly carboxylic acid chloride group), an epoxy group, an isocyanate group and a halogen group. Of them, a carboxyl group, a carboxylic anhydride group, a halogen group (particularly chloride group) and an isocyanate group are preferable. If cardanol or a hydrogenated cardanol is used as the hydroxy compound, the functional group to be reacted with phenolic hydroxy group thereof is, for example, a carboxylic anhydride group, a halogen group (particularly, a chloride group) and an isocyanate group. The functional group to be reacted with a hydroxy group of a cellulose is, for example, a carboxylic anhydride group, a carboxylic halide group (particularly, carboxylic acid chloride group) and an isocyanate group. The carboxylic anhydride group can be formed by acid anhydride-modifying a carboxyl group. The carboxylic halide group can be formed by acid halogenating a carboxyl group.

Specific examples of the multifunctional compound include dicarboxylic acids, carboxylic acid anhydrides, dicarboxylic acid halides, monochlorocarboxylic acids and diisocyanates. Examples of the dicarboxylic acids include malonic acid, succinic acid, glutaric acid, pimelic acid, suberic acid, azelaic acid, sebacic acid, dodecane dicarboxylic acid, pentadecane dicarboxylic acid and hexadecane dicarboxylic acid. Examples of the carboxylic anhydrides include anhydrides of these dicarboxylic acids. Examples of the dicarboxylic acid halides include acid halides of these dicarboxylic acids. Examples of the monochlorocarboxylic acids include monochloro acetic acid, 3-chloropropionic acid, 3-fluoropropionic acid, 4-chlorobutyric acid, 4-fluorobutyric acid, 5-chlorovaleric acid, 5-fluorovaleric acid, 6-chlorohexanoic acid, 6-fluorohexanoic acid, 8-chlorooctanoic acid, 8-fluorooctanoic acid, 12-chlorododecanoic acid, 12-fluorododecanoic acid, 18-chlorostearic acid and 18-fluorostearic acid. Examples of the diisocyanates include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethylxylene diisocyanate (TMXDI), 1,6,11-undecane triisocyanate, 1,8-diisocyanatomethyloctane, lysine ester triisocyanate, 1,3,6-hexamethylene triisocyanate, bicycloheptane triisocyanate and dicyclohexylmethane diisocyanate (HMDI: hydrogenated MDI). Of them, 4,4'-diphenylmethane diisocyanate (MDI) and 1,6-hexamethylene diisocyanate (HDI) can be suitably used as an isocyanate.

The average number of long-chain organic groups introduced per glucose unit of a cellulose ($DS_{LO}$) (long-chain organic group introduction ratio), in other words, the average number of hydroxy groups substituted with long-chain organic groups per glucose unit (hydroxy group substitution degree) can be appropriately set depending on the structure and introduction amount of the short-chain organic group, the structure of the long-chain organic group, physical properties required for a desired product and production efficiency, for example, set to fall within the range of 0.1 to 2.9. In order to obtain more sufficient introduction effect of the long-chain organic group, $DS_{LO}$ is preferably 0.2 or more and more preferably 0.3 or more. In view of production efficiency and durability (e.g., strength, heat-resistance), $DS_{LO}$ is preferably 2.0 or less, more preferably 1.5 or less and further preferably 1.0 or less. Particularly, in view of durability (e.g., strength, heat-resistance), $DS_{LO}$ is preferably 0.6 or less, more preferably 0.5 or less and particularly preferably 0.4 or less.

By introducing a long-chain organic group as mentioned above into a cellulose or a derivative thereof, it is possible to improve properties thereof such as water resistance, thermoplasticity and mechanical characteristics.

<Short-Chain Organic Group>

An acyl group having 2 to 4 carbon atoms (short-chain organic group) of a cellulose derivative (cellulose resin) according to the exemplary embodiment, can be introduced by use of a hydroxy group of a cellulose. A single type or two types or more of acyl groups can be introduced.

The above acyl group (short-chain organic group) can be introduced by reacting a hydroxy group of a cellulose and an acylating agent. The acyl group corresponds to an organic group portion introduced in place of a hydrogen atom of a hydroxy group of a cellulose. The acylating agent is a compound having at last one functional group reactive to a hydroxy group of a cellulose; for example, compounds having a carboxyl group, a carboxylic halide group and a carboxylic anhydride group, can be mentioned. Specific examples of the compound include aliphatic monocarboxylic acid, an acid halide and acid anhydride thereof.

Examples of an acyl group (short-chain organic group) having 2 to 4 carbon atoms include an acetyl group, a propionyl group, a butyryl group and an isobutyryl group. Of them, an acyl group (acetyl group, propionyl group) having 2 or 3 carbon atoms is preferable. A single type or two types or more of acyl groups can be introduced into a cellulose. More specifically, the cellulose resin in the exemplary embodiment is obtained by substituting the hydrogen atom of a hydroxy group of a cellulose with an acyl group having 2 to 4 carbon atoms. As the acyl group, an acetyl group or/and propionyl group are preferably used. Examples of the cellulose resin include acetyl cellulose, propionyl cellulose and acetyl propionyl cellulose which have a long-chain organic group and a high refractive-index organic group bound thereto.

The average number of acyl groups having 2 to 4 carbon atoms introduced per glucose unit of a cellulose ($DS_{SH}$) (short-chain organic group introduction ratio); in other words, the average number of hydroxy groups substituted with short-chain organic groups per glucose unit (hydroxy group substitution degree) can be set to fall within the range of 0.1 to 2.9. In order to sufficiently obtain an introduction effect of a short-chain organic group, particularly, in view of e.g., water resistance and flowability, $DS_{SH}$ is preferably 1.7 or more, more preferably 1.9 or more and further preferably 2.0 or more. In order to sufficiently obtain the effect of a long-chain organic group and other groups (e.g., hydroxy group) while obtaining the introduction effect of a short-chain organic group, $DS_{SH}$ is preferably 2.8 or less, more preferably 2.7 or less and further preferably 2.6 or less.

By introducing a short-chain organic group as mentioned above into a cellulose, it is possible to reduce intermolecular force (intramolecular bond) of the cellulose and plasticity thereof can be improved.

The ratio of short-chain organic groups relative to long-chain organic groups ($DS_{SH}/DS_{LO}$) is preferably 4 or more and 12 or less. If the ratio is 4 or more and appropriately large, the resultant material is appropriately flexible and tends to have sufficient strength and heat-resistance. Conversely, if the ratio is 12 or less and appropriately small, the resultant material has sufficient thermoplasticity and becomes suitable for use in molding.

<Residual Amount of Hydroxy Group>

As the residual amount of hydroxy groups increases, the maximum strength and heat-resistance of the cellulose resin tend to increase; whereas water absorbability tends to increase. In contrast, as the conversion rate (degree of substitution) of hydroxy groups increases, water absorbability tends to decrease, plasticity and breaking strain tend to increase; whereas, maximum strength and heat resistance tend to decrease. In consideration of these tendencies etc., the conversion rate of hydroxy groups can be appropriately set.

The average number of the remaining hydroxy groups per glucose unit of a cellulose resin (hydroxy group remaining degree) can be set to fall within the range of 0 to 2.9. In view of e.g., maximum strength and heat-resistance, hydroxy groups may remain. For example, the hydroxy group remaining degree may be 0.01 or more and further 0.1 or more. Particularly, in view of flowability, the hydroxy group remaining degree of a final cellulose resin is preferably 1.0 or less, more preferably 0.8 or less and particularly preferably 0.6 or less. Further, in view of, e.g., water resistance and impact resistance in addition to flowability, the hydroxy group remaining degree is preferably 0.6 or less, more preferably 0.5 or less, further preferably 0.4 or less, and particularly preferably 0.2 or less.

<Molecular Weight of Cellulose Derivative>

The molecular weight of a cellulose resin, more specifically, the weight average molecular weight thereof falls within the range of preferably 10000 to 200000, more preferably, 50000 to 200000 and further preferably 50000 to 150000. If the molecular weight is excessively large, flowability becomes low. As a result, it becomes difficult to not only process the cellulose resin but also uniformly mix it. In contrast, if the molecular weight is excessively small, physical properties thereof such as impact resistance decrease. The weight average molecular weight can be determined by gel permeation chromatography (GPC) (commercially available standard polystyrene can be used as a reference sample).

(Process for Producing Cellulose Derivative)

In the exemplary embodiment, the cellulose derivative can be produced, for example, by the following process. We will describe an example of a process for producing a cellulose derivative where a long-chain acyl group, particularly a long-chain aliphatic acyl group, is used as the long-chain organic group, below. Also in the case where a long-chain organic group is bound in another binding style, the following process can be appropriately modified and put in use.

<Activation of Cellulose>

Before the reaction step for introducing a long-chain organic group or a long-chain organic group and a short-chain organic group into a cellulose, an activation treatment (pretreatment step) can be performed in order to increase the reactivity of the cellulose. As the activation treatment, a treatment routinely performed for activating a cellulose before acetylation thereof, can be applied.

In the activation treatment, a cellulose is swollen by bringing the cellulose into contact with a solvent, for example, by a method of spraying an activation solvent having affinity for a cellulose to the cellulose or by a method (soaking method) of soaking a cellulose in an activation solvent. Owing to the treatment, a reactant easily penetrates between cellulose molecular chains (if a solvent and a catalyst are used, a reactant easily penetrates together with these), with the result that the reactivity of the cellulose improves. Examples of the activation solvent herein include water; carboxylic acids such as acetic acid, propionic acid, butyric acid, valeric acid, caproic acid, enanthic acid, caprylic acid, pelargonic acid and stearic acid; alcohols such as methanol, ethanol, propanol and isopropanol; nitrogen-containing compounds such as dimethylformamide, formamide, ethanolamine and pyridine; and sulfoxide compounds such as dimethylsulfoxide. A single type of activation solvent may be used alone or two types or more of activation solvents can be used in combination. Particularly preferably, water, acetic acid, pyridine and dimethylsulfoxide can be used.

A cellulose can be activated by putting it in a long-chain fatty acid. If the melting point of the long-chain fatty acid is room temperature or more, a cellulose can be heated up to the melting point or more.

The use amount of activation solvent relative to a cellulose (100 parts by mass) can be set to be, for example, 10 parts by mass or more, preferably 20 parts by mass or more and more preferably 30 parts by mass or more. If a cellulose is soaked in an activation solvent, the use amount of activation solvent relative to the cellulose in term of mass, can be set to be, for example, the same or more, preferably 5 times or more and more preferably 10 times or more. In view of load for removing an activation solvent after the pretreatment and cost reduction of materials, the use amount of activation solvent is preferably 300 times or less, more preferably 100 times or less and further preferably 50 times or less.

The temperature of the activation treatment can be appropriately set within the range of, for example, 0 to 100° C. In view of the efficiency of activation and reduction of energy cost, the temperature is preferably 10 to 40° C. and more preferably 15 to 35° C.

When a cellulose is put in a melted long-chain fatty acid, the cellulose can be heated up to melting point or more of the long-chain fatty acid.

The time for the activation treatment can be appropriately set within the range of, for example, 0.1 hour to 72 hours. In order to perform sufficient activation and reduce the treatment time, the time is preferably 0.1 hour to 24 hours and more preferably 0.5 hours to 3 hours.

After the activation treatment, an excessive activation solvent can be removed by a solid-liquid separation method such as suction filtration, filter press and compression.

The activation solvent contained in a cellulose can be substituted with the solvent to be used in the reaction after the activation treatment. For example, a substitution treatment can be performed in accordance with the soaking method for an activation treatment mentioned above by changing the activation solvent to the solvent to be used in the reaction.

<Method for Introducing Long-Chain Organic Group and Short-Chain Organic Group>

A cellulose derivative (cellulose resin) according to the exemplary embodiment can be produced, for example, in accordance with the method shown below.

A process for producing a cellulose derivative according to the exemplary embodiment includes a step of reacting, in an organic solvent, a cellulose dispersed in the organic solvent, a short-chain acylating agent and a long-chain acylating agent in the presence of an acid trapping component while warming, to acylate hydroxy groups of the cellulose constituting the cellulose. It is preferable that the short-chain acylating agent and long-chain acylating agent are dissolved in the solvent. The acid trapping component can be used as a solvent.

If a long-chain organic group of a linear saturated fatty acid is introduced into a cellulose, as the long-chain acylating agent, a compound selected from acid chlorides and acid anhydrides of the linear saturated fatty acid as mentioned above is preferable. A single type of a long-chain acylating agent may be used alone or two or more types of long-chain acylating agents may be used in combination. As a short-chain reactant for introducing a short-chain component into a cellulose, a compound selected from acetyl chloride, anhydrous acetic acid, propionyl chloride and propionic anhydride is preferable. A single type of a short-chain reactant may be used alone or two types or more of short-chain reactants may be used in combination.

The addition amounts of the long-chain reactant and short-chain reactant can be set in accordance with the degree of substitution ($DS_{LO}$) with a long-chain organic group and the degree of substitution ($DS_{SH}$) with a short-chain component of a desired cellulose derivative. If the short-chain reactant is excessively present, the binding amount of a long-chain organic group tends to decrease and the degree of substitution ($DS_{LO}$) with a long-chain organic group tends to decrease.

As the organic solvent, a solvent providing a liquid holding rate by cellulose: 90 vol % or more, is preferably used.

The "liquid holding rate" can be measured as follows.

Filter paper (5B, 40 mmφ, water content: about 2%) made of cotton fiber is soaked in each solvent at room temperature for one hour. The weights of the filter paper before and after soaking are measured and assigned to the following expression. In this manner, a liquid holding rate (vol %) is obtained. The weight of a sample after soaking is measured at the time when dripping of a solvent from the sample is stopped.

$$\text{Liquid holding rate (vol \%)}=(\text{weight after soaking}-\text{weight before soaking})/\text{weight before soaking}/\text{specific gravity of solvent}\times 100$$

Examples of a solvent providing a liquid holding rate of 90 vol % or more, include water (liquid holding rate: 145 vol %), acetic acid (liquid holding rate: 109 vol %), dioxane (liquid holding rate: 93 vol %), pyridine (liquid holding rate: 109 vol %), N-methyl pyrrolidone (liquid holding rate: 104 vol %), N,N-dimethylacetamide (liquid holding rate: 112 vol %), N,N-dimethylformamide (liquid holding rate: 129 vol %) and dimethylsulfoxide (liquid holding rate: 180 vol %).

An acid trapping component is not particularly limited as long as it is a base neutralizing an acid (e.g., hydrochloric acid, acetic acid, propionic acid) produced as a by-product. Examples thereof include alkaline metal hydroxides such as sodium hydroxide and potassium hydroxide; alkaline earth metal hydroxides such as calcium hydroxide and barium hydroxide; metal alkoxides such as sodium methoxide, sodium ethoxide; and nitrogen-containing nucleophilic compounds such as diazabicycloundecene, diazabicyclononene, triethylamine and pyridine. Of them, triethylamine and pyridine are preferable since they can be used also as a solvent and pyridine is particularly preferable. When an acid trapping component is added independently of a solvent, it is preferable that the acid trapping component is present in a reaction system from the initiation time of a reaction. As long as an acid trapping component is present in a reaction system from the initiation time of a reaction, an acid trapping component may be added before or after addition of an acylating agent.

The addition amount of an acid trapping component relative to the total amount of a starting long-chain acylating agent and a starting short-chain acylating agent is preferably 0.1 to 10 equivalents and more preferably 0.5 to 5 equivalents. However, when a nitrogen-containing nucleophilic compound which is an acid trapping component is used as a solvent, the addition amount of an acid trapping component is not limited the above range. If the addition amount of acid trapping component is small, an acylation reaction efficiency decreases. In contrast, if the addition amount of an acid trapping component is large, the cellulose is sometimes decomposed and reduced in molecular weight.

The reaction temperature in the acylation step is preferably 50 to 100° C. and more preferably 75 to 95° C. The reaction time can be set at 2 hours to 5 hours and preferably 3 hours to 4 hours. If the reaction temperature is sufficiently high, the reaction speed can be increased, with the result that an acylation reaction can be completed in a relative short time and the reaction efficiency can be increased. If the reaction temperature falls within the above range, a decrease in molecular weight by heating can be suppressed.

The amount of an organic solvent can be set to be 10 to 50 times and preferably 20 to 40 times (mass ratio) as large as the amount (dry mass) of the raw material cellulose.

<Aging Step>

After the above acylation step, an aqueous alkaline solution is added, and the reaction solution can be held (aged) as it is while warming. The temperature during the aging is preferably 25 to 75° C. and preferably 40 to 70° C. The time for aging can be set to fall within the range of 1 to 5 hours and preferably 1 to 3 hours.

The addition amount of an aqueous alkaline solution can be set so as to correspond to 3 to 30% by mass relative to the solvent to be used, and preferably 5 to 20% by mass.

As the aqueous alkaline solution, aqueous solutions of, e.g., potassium hydroxide, sodium carbonate and sodium hydrogen carbonate are mentioned, and an aqueous solution of sodium hydroxide is preferable. The concentration of an aqueous alkaline solution is preferably 1 to 30% by mass and more preferably 5 to 20% by mass.

Owing to such an aging step, the long-chain organic group and the short-chain component once bound are partially hydrolyzed to come back to (homogeneous) hydroxy groups, with the result that mechanical characteristics such as strength and impact resistance can be enhanced. In addition, in the following precipitation step, a product having satisfactory properties (fine granules) can be obtained.

<Recovery Step>

A cellulose derivative (product), which is formed by introducing a long-chain organic group and a short-chain organic group, can be recovered from a reaction solution in accordance with a recovery method generally used. The recovery method is not limited; however, if a product is not dissolved in a reaction solution, a solid-liquid separation method for separating a reaction solution and a product is preferable in view of production energy. If it is difficult to separate a solid and a liquid because a product is dissolved in or compatible with a reaction solution, the reaction solution is distilled off and a product can be recovered as the residue. Alternatively, a poor solvent for a product is added to the reaction solution to precipitate the product, which may be recovered by solid-liquid separation.

When a reaction solution is distillated, it is preferable to use a short-chain reactant, a reaction solvent and a catalyst having low boiling points. The catalyst can be removed from a product with, e.g., a washing solvent without distillation. When components except a product, such as a solvent, are distilled away from a reaction solution, distillation is stopped when a product is precipitated, and then, the remaining reaction solution and the precipitated product can be subjected to solid-liquid separation to recovery the product.

As the solid-liquid separation method, e.g., filtration (natural filtration, filtration under reduced pressure, pressure filtration, centrifugal filtration and these while applying heat), spontaneous sedimentation and flotation, separation (by funnel), centrifugal separation and squeeze, are mentioned. These can be used appropriately in combination.

A product (a cellulose derivative) dissolved in a filtrate after the solid-liquid separation can be precipitated by adding a poor solvent for the product and further subjected to solid-liquid separation to recover it.

The solid content (a cellulose derivative) recovered from a reaction solution is, if necessary washed and dried by a method generally employed.

The cellulose derivative produced by this method can possess a reinforcing crystal structure due to a cellulose main-chain crystal in a thermoplastic matrix. This is derived from an unreacted part when a cellulose material is acylated. Such a cellulose main-chain crystal can be evaluated, for example, by X-ray diffractometry. At the time of evaluation, for example, a cellulose derivative can be pressed to increase the density, thereby facilitating detection of a signal.

<Other Process for Producing Cellulose Derivative>

A cellulose resin can be obtained by acylating a cellulose in a solid-liquid heterogeneous system using a mixed acid anhydride containing a long-chain organic group and a short-chain organic group, as an acylating agent. Cellulose is preferably activated. The activation treatment can be performed by a method generally used.

Acylation can be carried out in a solvent which provides a liquid holding rate of 90% or more (for example, dioxane, in an amount of, e.g., 80 to 120 times as large as the dry weight of cellulose), in the presence of an acid catalyst (for example, sulfuric acid) while stirring at 45 to 65° C. for 2 to 5 hours. Thereafter, it is preferable that water is added to age the reaction solution for a few hours (for example, 1 to 3 hours) while heating (for example, 55 to 75° C.).

After completion of the reaction, a poor solvent such as a water/methanol solvent mixture, is added to allow a product dissolved in the liquid phase to sufficiently precipitate, and then, solid-liquid separation can be performed to recover a product. Thereafter, washing and drying can be made.

Acylation can be performed in a homogeneous solution system in which a cellulose and an acylating agent are homogenously dissolved in a solvent. A cellulose is preferably activated. The activation treatment can be performed by a method generally used.

As a solvent for acylation, a solvent such as N,N-dimethylacetamide, which can dissolve a cellulose, is used.

As the acylating agent, a mixed acid anhydride having a long-chain organic group and a short-chain organic group, which is produced in the same solvent as the solvent to be used in acylation, can be used.

After completion of the reaction, a poor solvent such as methanol is added to precipitate a product, which may be recovered by solid-liquid separation. Thereafter, washing and drying can be made.

<Method for Introducing High Refractive-Index Organic Group>

A cellulose derivative having a high refractive-index organic group, a long-chain organic group and a short-chain organic group can be obtained, for example, by introducing the high refractive-index organic group into a cellulose derivative having the long-chain organic group and the short-chain organic group introduced therein and obtained as mentioned above. A high refractive-index organic group can be introduced by preparing a reactant (for example, acid halide) containing the high refractive-index organic group as mentioned above, and allowing the reactant to react with a hydroxy group of a cellulose derivative in the same manner as in the method for introducing a long-chain organic group and a short-chain organic group as mentioned above. The cellulose derivative obtained can be recovered in the same manner as in the aforementioned recovery step.

(High Refractive-Index Organic Material)

As the high refractive-index organic material contained in the cellulose resin composition according to the exemplary embodiment, a high refractive-index organic material which does not significantly decrease the refractive index of a cellulose resin composition is preferable; and more specifically, a high refractive-index organic material having a refractive index of 1.50 or more is preferably used. Also, a high refractive-index organic material having a larger refractive index than that of the cellulose resin to be used is preferable. As such a high refractive-index organic material, an organic compound having at least one group selected from an aromatic ring, a phosphorus atom-containing group, a sulfur atom-containing group, a halogen group except fluorine, an alicyclic group and an organic metal portion, can be used; and a high refractive-index organic material at least containing an aromatic ring is preferable.

In the exemplary embodiment, the "aromatic ring" of the high refractive-index organic material can be present as an aromatic ring group (aromatic group) in a molecular structure of a compound. The aromatic ring group refers to a cyclic group having aromaticity and may be a single-ring group or a condensed ring group, and may be an aromatic hydrocarbon ring group (aryl group) or an aromatic heterocyclic group (heteroaryl group); and may or may not have a further substituent. Examples of the aromatic ring constituting the aromatic ring group are as follows. Examples of the aromatic rings constituting an aryl group include, but are not limited to, a benzene ring and a naphthalene ring; and examples of the aromatic rings constituting a heteroaryl group include, but are not limited to, a furan ring, a thiophene ring, a pyrrole ring, an imidazole ring and a pyridine ring. Examples of the aryl group include a phenyl group derived from a benzene ring as an aromatic ring and a 1-naphthyl group and a 2-naphthyl group derived from a naphthalene ring as an aromatic ring. The heteroaryl group is a heteroaromatic ring group containing one or more hetero atoms. Examples of the hetero atoms include oxygen atom, nitrogen atom and sulfur atom. The heteroaryl group preferably contains 5 or 6 ring atoms including a hetero atom. Specific examples of the heteroaryl group include a furyl group, a thienyl group, a pyrrolyl group, an imidazolyl group and a pyridyl group.

The aromatic ring group may be substituted. In the case where the aromatic ring group is "substituted", examples of a substituent include, but are not limited to, a hydroxy group; a halogen atom (for example, a fluorine atom, a chlorine atom, a bromine atom and an iodine atom); an amino group; a mono or dialkylamino group (for example, a dimethylamino group, a diethylamino group and a dibutylamino group); a nitro group; a cyano group; an alkyl group (for example, a C1-8 alkyl group); a C1-8 alkoxy group (for example, a methoxy group, an ethoxy group and an isopropoxy group); and a C3-8 cycloalkyl group.

Note that, the refractive index in the present invention is refractive index $n_D$ of D line (light having a wavelength of 589.3 nm) of a sodium lamp, and can be measured by the Abbe refractometer.

The high refractive-index organic material preferably has a solubility to a cellulose resin (compatibility with a cellulose resin). The solubility can be represented based on the SP value (compatibility parameter, unit: $(cal/cm^3)^{1/2}$) calculated by the Fedors method. The high refractive-index organic material having a SP value, which differs by 3 or less in terms of absolute value from the SP value of a cellulose resin, is suitably used. For example, the high refractive-index organic material having a difference in SP value of 2 or less, can be used. In general, as the difference (absolute value) in SP value decreases, the compatibility tends to increase. As the compatibility increases, the transparency of a molded body (colorant-free) tends to increase, with the result that problems caused by phase separation, such as white turbidity, spots and bleed out, can be avoided and the appearance-quality of the molded body can be enhanced.

Note that, the SP value is represented by the following expression.

$$SP\ value\ (\delta) = (\Delta H/V)^{1/2}$$

where $\Delta H$ represents molar heat of vaporization (cal/mol); and V represents molar volume (cm$^3$/mol).

As $\Delta H$ and V in the expression, the total ($\Delta H$) of molar heat of vaporization of the atomic group and the total (V) of molar volumes described in POLYMER ENGINEERING AND FEBRUARY, 1974, Vol. 14, No. 2, Robert F. Fedors. (pages 151 to 153) can be used.

As the high refractive-index organic material compatible with a cellulose resin, a compound having a polar group can be used. Examples of the polar group include nitrogen atom-containing groups such as a cyano group (CN), and a triazine group; phosphorus atom-containing groups such as a phosphate group (PO$_4$ group) and a phosphazene group; sulfur atom-containing groups such as a sulfonyl (SO$_2$) group, a sulfide group (—S—) and a disulfide group (—S—S—); and oxygen atom-containing groups such as a carbonyl group (C=O), a hydroxy group (OH) and an ether group (C—O—C).

In view of refractive index and compatibility, the high refractive-index organic material is preferably an organic compound having both an aromatic ring and a polar group.

Examples of such a high refractive-index organic material include high refractive-index resins; phosphorous organic compounds such as a phosphoric acid ester, and hexaphenoxycyclotriphosphazene; sulfur organic compounds such as diphenyl sulfone, diphenyl sulfide, diphenyl disulfide and DBSP (2,4-bisphenylsulfonylphenol); triazine-based compounds; fluorene derivatives such as bisphenoxyethanol fluorene (BPEF); and benzophenone-based compounds.

Examples of the high refractive-index resin include polycarbonate, polystyrene, a copolymer of acrylonitrile and styrene (AS resin), polyethylene terephthalate (PET), a copolymerized PET, glycol modified PET, polybutylene terephthalate, polytrimethylene terephthalate, polysulfone, polyethersulfone, polyphenylsulfone, polyarylate and fluorene polyester.

As the phosphoric acid ester, at least one selected from the following aromatic phosphates can be used.

Aromatic condensed phosphate compound (for example, PX-200 (trade name) manufactured by DAIHACHI CHEMICAL INDUSTRY CO., LTD.) represented by the following formula:

[Formula 4]

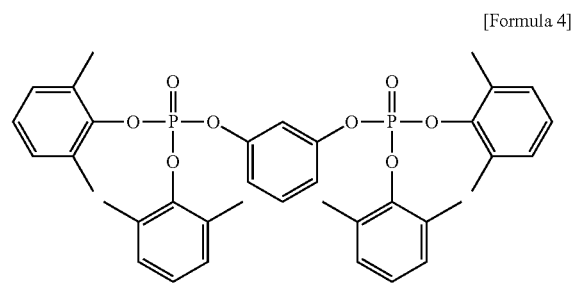 [SMILES: Cc1cccc(C)c1OP(=O)(Oc1cccc(OP(=O)(Oc2c(C)cccc2C)Oc2c(C)cccc2C)c1)Oc1c(C)cccc1C]

Aromatic condensed phosphate compound (for example, CR-733S (trade name) manufactured by DAIHACHI CHEMICAL INDUSTRY CO., LTD.) represented by $(C_6H_5O)_2P(O)OC_6H_4OP(O)(OC_6H_5)_2$;

Aromatic condensed phosphate compound (for example, CR-741 (trade name) manufactured by DAIHACHI CHEMICAL INDUSTRY CO., LTD.) represented by $(C_6H_5O)_2P(O)OC_6H_4C(CH_3)_2C_6H_4OP(O)(OC_6H_5)_2$; Triphenyl phosphate (for example, TPP (trade name) manufactured by DAIHACHI CHEMICAL INDUSTRY CO., LTD.);

Tricresyl phosphate (for example, TCP (trade name) manufactured by DAIHACHI CHEMICAL INDUSTRY CO., LTD);

Trixylenyl phosphate (for example, TXP (trade name) manufactured by DAIHACHI CHEMICAL INDUSTRY CO., LTD.);

Cresyl diphenyl phosphate (for example, CDP (trade name) manufactured by DAIHACHI CHEMICAL INDUSTRY CO., LTD.);

Cresyl di-2,6-xylenyl phosphate (for example, PX-110 (trade name) manufactured by DAIHACHI CHEMICAL INDUSTRY CO., LTD.).

Of the aromatic phosphates, an aromatic condensed phosphate having a large molecular weight and rarely volatile is preferable, in view of appearance of a molded body.

As the triazine-based compound, a compound represented by the following formula is mentioned.

[Formula 5]

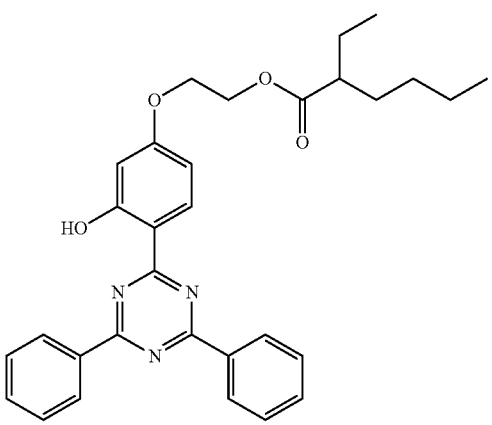

As the benzophenone-based compound, a compound represented by the following formula is mentioned.

[Formula 6]

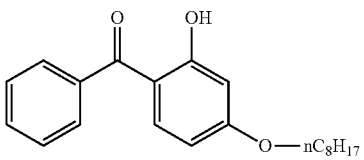

(Colorant)

The cellulose resin composition according to the exemplary embodiment can contain a colorant (C). As the colorant, various inorganic or organic pigments or dyes corresponding to desired color phases such as black, white, yellow, orange, red, purple, blue and green, can be used. Also a plurality of colorants may be used in combination.

If high external-appearance quality depending on jet-black color is desired, carbon black is preferably used as the colorant (C).

The carbon black is preferably acidic, more specifically, pH 5 or less, more preferably pH 4 or less and further preferably pH 3.5 or less. If such an acidic (low pH value) carbon black is used, the brightness of the resultant molded body can be reduced. For example, carbon black having preferably pH 2.5 to 4 and more preferably pH 2.5 to 3.5 can be suitably used.

The pH value is obtained by measuring a mixed solution of carbon black and distilled water by a glass-electrode pH meter and specifically, measured in accordance with the following method. A pure water (100 ml) boiled and degassed is added to a sample (10 g). The mixture is boiled on a hot plate for 15 minutes and cooled to room temperature. Thereafter, the supernatant is removed and pH of the resultant muddy substance is measured by a glass-electrode pH meter.

Due to interaction or binding of an acidic group (for example, carboxylic acid group) on the surface of such acidic carbon black and a polar group (for example, hydroxy group) of a cellulose resin, affinity thereof is improved and high dispersion of carbon black occurs, which presumably contributes to reduction in brightness.

The average particle diameter of carbon black is preferably 1 to 20 nm, more preferably 5 to 20 nm and further preferably 8 to 18 nm. As the average particle diameter decreases, the brightness of a molded body decreases, with the result that high-quality black (jet black) appearance tends to be obtained. Conversely, as the average particle diameter increases, dispersibility tends to increase. In view of these points, carbon black having a particle diameter within the above range is preferably used.

The average particle diameter is the arithmetic average diameter of carbon black particles obtained by observing the particles by an electron microscope.

The specific surface area of carbon black is preferably 140 $m^2/g$ or more, and more preferably 180 $m^2/g$ or more, in view of, e.g., jet-black color of a molded body. Also, in view of, e.g., dispersibility, carbon black having a specific surface area of 1000 $m^2/g$ or less, 700 $m^2/g$ or less, and further 500 $m^2/g$ or less, can be used. The relationship between the particle diameter and the specific surface area is as follows: In general, as the particle diameter decreases, the specific surface area increases. In view of brightness and appearance of a molded body and dispersibility of particles, carbon black having a BET specific surface area within the above range is preferably used.

The specific surface area is BET specific surface area (JIS K6217) obtained from nitrogen adsorption amount in accordance with S-BET equation.

(Cellulose Resin Composition)

The cellulose resin composition according to the exemplary embodiment contains a cellulose derivative (A) and a colorant (C).

The cellulose resin composition may contain a high refractive-index organic material (B). The content of the high refractive-index organic material (B) relative to the cellulose derivative (A) (100 parts by mass) is preferably 0 to 100 parts by mass, more preferably 0 to 50 parts by mass and further preferably 0 to 25 parts by mass.

If the content of the high refractive-index organic material (B) falls within the aforementioned range, it is possible to obtain a molded body having high external-appearance quality (particularly high glossiness) while keeping mechanical characteristics mainly provided by a cellulose derivative.

If a low molecule compound (for example, a phosphoric acid ester) is used as a high refractive-index organic material (B), as the content increases, bleed out tends to easily occur. Because of this, the mass fraction (B/A) is preferably 50/50 or less, more preferably 30/70 or less and further preferably 20/80 or less.

If a high refractive-index resin is used as the high refractive-index organic material (B), it is preferable to use a high refractive-index organic material serving as a plasticizer in combination. If the plasticizer is used, the molding temperature can be reduced and phase separation between mutual resins rarely occurs. Further, since the plasticizer itself has a high refractive index, the refractive index of a cellulose resin composition can be increased. As a result, a molded body having high external-appearance quality can be obtained.

From such a view point, the mass fraction (B2/B1) of the plasticizer (B2) relative to the high refractive-index resin (B1) is preferably 10/90 to 70/30, more preferably 20/80 to 50/50 and further preferably, 25/75 to 40/60. As the content of the plasticizer (B2) increases, compatibility can be enhanced. If the content of the plasticizer is excessively large, bleed out tends to easily occur. Because of this, the mass fraction (B2/B1) is preferably set to fall within the above range. The ratio of the plasticizer component (B2) to the resin component (A+B1), B2/(A+B1), is preferably, 3/97 to 50/50, more preferably, 5/95 to 30/70, and further preferably 5/95 to 20/80.

As the plasticizer, a phosphorous organic compound is preferable. In particular, a phosphoric acid ester high in plasticity is preferable. Also, a phosphorous compound having a larger refractive index than that of a cellulose resin is preferable. The refractive index thereof is larger than 1.50 is more preferable. As such a phosphorous organic compound, a phosphorous organic compound having an aromatic ring and preferably a phosphoric acid ester having an aromatic ring can be used.

The content of carbon black (C) in the cellulose resin composition according to the exemplary embodiment relative to the whole the cellulose resin composition can be set to fall within the range of 0.05 to 10% by mass. In order to obtain a sufficient coloring effect, the content ratio of carbon black is preferably 0.1% by mass or more, preferably 0.2% by mass or more, and further preferably 0.5% by mass or more. In order to reduce the residual amount of carbon black while obtaining a sufficient coloring effect, the content ratio can be preferably set to be 5% by mass or less, more preferably 3% by mass or less, and further preferably 2% by mass or less (for example, 1% by mass or less).

The cellulose resin composition according to the exemplary embodiment may contain other components as long as the resultant molded body does not lose desired appearance and properties. In order to obtain a molded body having high external-appearance quality, the content of a cellulose derivative (if a high refractive-index organic material is contained, the total content of a cellulose derivative and a high refractive-index organic material) is preferably high. For example, the content of a cellulose derivative (if a high refractive-index organic material is contained, the total content of a cellulose derivative and a high refractive-index organic material) relative to the amount of the cellulose resin composition excluding the colorant (C) (the amount of the cellulose resin composition from which the colorant (C) is removed) can be set to fall within the range of 90 to 100% by mass, preferably 95% by mass or more, more preferably 98% by mass or more and further preferably 99% by mass or more.

As the other components, additives usually used in common resin materials for molding may be contained. Examples of the additives include an antioxidant such as a phenol-based compound and phosphorous compound, a colorant, a light stabilizer, an ultraviolet absorber, an antistatic agent, an antibacterial/antifungal agent, a flame retardant and a plasticizer. In particular, additives usually used in common cellulose resins may be contained. Examples of the additives include a plasticizer, a flame retardant and ultraviolet absorber.

(Process for Producing Composition)

A process for producing the cellulose resin composition according to the exemplary embodiment is not particularly limited. The cellulose resin composition can be obtained, for example, by melt-mixing a cellulose resin, a colorant (for example, carbon black) and optional additives by a mixer usually used. As the mixer, for example, a tumbler mixer, a ribbon blender, a single screw and a multi-screw extruder, a kneader or a compounding apparatus such as a kneading roll, can be used. After the melt-mixing, if necessary, granulation into an appropriate shape can be carried out; for example, pellets can be formed by a pelletizer.

(Molded Body)

The molded body formed of the cellulose resin composition according to the exemplary embodiment can be molded into a desired shape by a common molding method. The shape is not limited and the thickness of the molded body is not limited; however in order to obtain higher external-appearance quality, the thickness is preferably 0.5 mm or more, and more preferably 0.8 mm or more. Also, the upper limit of the thickness of the molded body is not particularly limited and can be appropriately set depending on a desired e.g., shape and strength. Even if the thickness is set, for example, 10 mm or less and further 5 mm or less, high external-appearance quality as well as sufficient mechanical strength can be obtained. Since a colorant (for example, carbon black) is distributed over the entire molded body (all directions including thickness direction), a molded body having a desired shape and high external-appearance quality can be obtained even if e.g., coating or a decorative film is not applied.

The cellulose resin composition according to the exemplary embodiment can be formed into a molded body in accordance with an intended use by a common molding method such as injection molding, injection compression molding, injection blow molding, extrusion molding and blow molding.

Since the molded body formed of the cellulose resin composition according to the exemplary embodiment has high external-appearance quality and excellent mechanical characteristics, the molded body can be used in place of members used in electronic devices, home appliances, various containers, building materials, furniture, writing materials, automobiles and household articles. The molded body can be used in, for example, housing and exterior parts of electronic devices or home appliances, various storage cases, dishes, interior members of building materials, interior materials of automobiles and other daily necessities.

According to the exemplary embodiment, it is possible to provide products containing a molded body formed of the resin composition of the present invention, such as electronic devices or home appliances, automobiles, building materials, furniture, writing materials and household articles.

Examples of use for electronic devices or home appliances include housing for personal computers, fixed phones, mobile phone terminals, smart phones, tablets, POS terminals, routers, projectors, speakers, lighting fixtures, calculators, remote controllers, refrigerators, washing machines, humidifiers, dehumidifiers, video recorders/players, vacuum cleaners, air conditioners, rice cookers, electric shavers, electric toothbrushes and dishwashers; and cases for mobile terminals such as smart phones.

Examples of use for automobiles include interior parts such as instrument panels, dashboards, cup holders, door trims, armrests, door handles, door locks, handles, brake levers, ventilators and shift levers.

Examples of use for building materials include interior members such as wall materials, floor materials, window frames and doorknobs.

Examples of use for furniture include packaging of drawers, bookshelves, tables and chairs.

Examples of use for writing materials include packaging of pens, pen cases, book covers, scissors, and cutters.

Examples of use for daily necessities include glass frames.

EXAMPLES

The present invention will be more specifically described by way of examples below.

(Preparation of Short-Chain/Long-Chain Bound Cellulose Derivative)

Cellulose acetate (L-50 manufactured by Daicel Corporation, DS of acetyl group=2.4) was dried at 100° C. for 7 hours. Then, 500 g (1.90 mol/AGU, AGU refers to glucose residue) of the cellulose acetate was weighed and placed in a 20 L-reaction vessel purged with nitrogen. Subsequently, dehydrated 1,4-dioxane (14.5 L) was poured and the mixture was stirred by a mechanical stirrer while heating the mixture at 50 to 75° C. to dissolve the cellulose acetate in dioxane. Thereafter, the reaction vessel was cooled. After the temperature of the reaction vessel reached 40° C. or less, a solution of stearoyl chloride (288 g (0.95 mol)) dissolved in dehydrated 1,4-dioxane (0.25 L) was poured, and then, a solution of triethylamine (0.25 L (1.79 mol)) dissolved in dehydrated 1,4-dioxane (0.25 L) was poured. The temperature of the mixture was raised to 100° C. and then the mixture was stirred for 4 hours. Thereafter, methanol (0.25 L) was poured to terminate the reaction. Further, methanol (120 L) was poured and the precipitate was collected by suction filtration. The residue was dispersed in isopropanol (10 L) and the mixture was stirred at 50 to 60° C. for 20 minutes and subjected to suction filtration. This operation was repeated three times to perform purification. The residue finally obtained was dried under vacuum at 105° C. for 5 hours to obtain a final product (short-chain/long-chain bound cellulose derivative).

(Preparation of Short-Chain/Long-Chain/High Refractive-Index Group Bound Cellulose (1))

The short-chain/long-chain bound cellulose derivative (30 g) obtained above was placed in a 1 L four-neck flask, which was then purged with nitrogen. Then, dehydrated 1,4-dioxane (600 mL) was poured and the mixture was heated for one hour while stirring at 70° C. to dissolve the derivative. After the solution was cooled to room temperature, a mixture of 3-phenylpropionyl chloride (20.74 g (0.123 mol)) and dehydrated 1,4-dioxane (30 mL) was added in the solution, and further, a mixture of triethylamine (18.67 g (0.185 mol)) and dehydrated 1,4-dioxane (20 mL) was added in the solution. After the resultant solution was allowed to react at 90° C. for 4 hours, methanol (1.5 L) was poured in the reaction solution while stirring. Further, pure water (450 mL) was added dropwise in the solution to produce a precipitate. The precipitate was filtered off and dissolved in 800 mL of chloroform, re-precipitated using methanol (2.0 L), and dried under reduced pressure at 105° C. for 4 hours to obtain a final product (short-chain/long-chain/high refractive-index group bound cellulose 1)(34.2 g).

(Preparation of Short-Chain/Long-Chain/High Refractive-Index Group Bound Cellulose (2))

The short-chain/long-chain bound cellulose derivative (30 g) obtained above was placed in a 1 L four-neck flask, which was then purged with nitrogen. Then, dehydrated 1,4-dioxane (600 mL) was poured and the mixture was heated for one hour while stirring at 70° C. to dissolve the derivative. After the solution was cooled to room temperature, a mixture of diphenyl chlorophosphate (34.79 g (0.130 mol)) and dehydrated 1,4-dioxane (30 mL) was added in the solution, and further, a mixture of triethylamine (19.79 g (0.196 mol)) and dehydrated 1,4-dioxane (20 mL) was added in the solution. After the resultant solution was allowed to react at 90° C. for 4 hours, methanol (2.0 L) was poured in the reaction solution while stirring. Further, pure water (450 mL) was added dropwise in the solution to produce a precipitate. The precipitate was filtered off and stirred in methanol (500 mL) for one hour and purified. Finally, the precipitate was dried under reduced pressure at 105° C. for 4 hours to obtain a final product (short-chain/long-chain/high refractive-index group bound cellulose 2)(32.0 g).

Example 1

Short-chain/long-chain/high refractive-index group bound cellulose (1) (DS of an acetyl group=2.3, DS of a stearoyl group=0.26, DS of 3-phenylpropionyl group (PP group)=0.34) was prepared in accordance with the above process.

A molded body (a sample for evaluation) was formed of the resin prepared above in accordance with the following method for forming a molded body (molding method). The glossiness and brightness of the molded bodies obtained were evaluated in accordance with the following measurement methods. The results are shown in Table 1.

Example 2

As the constitution materials for a desired composition, a short-chain/long-chain/high refractive-index group bound cellulose (1) and acidic carbon black (trade name: Mitsubishi carbon black #2650, average particle diameter: 13 nm, acidity: pH 3, manufactured by Mitsubishi Chemical Corporation) were prepared.

Then, short-chain/long-chain/high refractive-index group bound cellulose (1) (99 parts by mass) and acidic carbon black (1 part by mass) were mixed well by hand.

A resin composition was formed from the resultant mixture and then the composition was used to form a molded body (a sample for evaluation) in accordance with the following method for forming a molded body. The glossiness and brightness of the molded body obtained were evaluated in accordance with the following measurement methods. The results are shown in Table 1.

Example 3

A mixture was obtained in the same manner as in Example 2 except that the constitution materials for a desired composition and blending ratio thereof shown in Table 1 were used.

A resin composition was formed from the resultant mixture and then the composition was used to form a molded body (a sample for evaluation) in accordance with the following method for forming a molded body. The glossiness and brightness of the molded body obtained were evaluated in accordance with the following measurement methods. The results are shown in Table 1.

Example 4

A short-chain/long-chain/high refractive-index group bound cellulose (2) (DS of an acetyl group=2.2, DS of a stearoyl group=0.26, DS of a diphenyl phosphoric acid ester group (DPP group)=0.08) were prepared in accordance with the above process.

A molded body (a sample for evaluation) was formed of the resin prepared in accordance with the following method for forming a molded body (molding method). The glossiness and brightness of the molded body obtained were evaluated in accordance with the following measurement methods. The results are shown in Table 1.

A resin composition was formed from the resin prepared and then the composition was used to form a molded body (a sample for evaluation) in accordance with the following method for forming a molded body. The glossiness and brightness of the molded body obtained were evaluated in accordance with the following measurement methods. The results are shown in Table 1.

Comparative Examples 1 to 7

In Comparative Examples 1 and 2, the resins shown in Table 1 were prepared. In Comparative Examples 3 to 7, mixtures were prepared in the same manner as in Example 1 except that the constitution materials for desired compositions and blending ratios thereof shown in Table 1 were used.

Pellets of resins or resin compositions were formed from the resins or the mixtures prepared, respectively, and then the pellets were used to form molded bodies (samples for evaluation), in accordance with the following method for forming a molded body. The glossiness and brightness of the molded bodies obtained were evaluated by the following measurement methods. The results are shown in Table 1.

Constitution materials used in Examples and Comparative Examples are as follows. Short-chain/long-chain/high refractive-index group bound cellulose (1)-PP group (DS of an acetyl group=2.3, DS of a stearoyl group=0.26, DS of a PP group=0.34)

Short-chain/long-chain/high refractive-index group bound cellulose (2)-DPP group (DS of an acetyl group=2.2, DS of a stearoyl group=0.26, DS of a DPP group=0.08)

Short-chain/long-chain bound cellulose: acetyl group-stearoyl group bound acylated cellulose (DS of an acetyl group=2.3, DS of a stearoyl group=0.26, weight average molecular weight=95000)

Short-chain bound cellulose: cellulose acetate propionate, DS of a propionyl group=2.49, DS of an acetyl group=0.18 (trade name: CAP-482-20, manufactured by Eastman Chemical Company), weight average molecular weight=120000 (based on standard polystyrene), number average molecular weight=39000 (based on standard polystyrene) PBS resin: polybutylene succinate (trade name: GSPla, grade: FZ71PD, manufactured by Mitsubishi Chemical Corporation)

Carbon black 1: acidic carbon black (average particle diameter: 13 nm, pH 3) (trade name: Mitsubishi carbon black #2650 manufactured by Mitsubishi Chemical Corporation)

Carbon black 2: neutral carbon black (average particle diameter: 13 nm, pH 6.5) (trade name: Mitsubishi carbon black #2600 manufactured by Mitsubishi Chemical Corporation Carbon black 3: neutral carbon black (average particle diameter: 24 nm, pH 7.5) (trade name: Mitsubishi carbon black #40B manufactured by Mitsubishi Chemical Corporation (Method for Forming a Molded Body/Preparation of Samples for Evaluation)
<Kneading Method>

The resin prepared or the mixture obtained was loaded in a double-screw kneader (product name: HAAKE MiniLab Rheomex CTWS manufactured by Thermo Electron Corporation) and kneaded at a kneading temperature of 200 to 220° C. and a rotation speed of 60 rpm to obtain pellets. The kneading temperature was set to be 200° C. in Examples 1 to 4, and 220° C. in Comparative Examples 1 to 7.

<Molding Method>

Using a small injection molding machine (product name: HAAKE MiniJet II manufactured by Thermo Electron Corporation), molded bodies having the following shape were produced from the pellets obtained above. The pellets were dried at 80° C. for 5 hours immediately before molding and then put in use.

Size of a molded body: thickness 2.4 mm, width 12.4 mm, length 80 mm

The molding conditions were set as follows.

Cylinder temperature of molding machine: 230° C.,

Mold temperature: 100° C.,

Injection pressure: 1200 bar (120 MPa)/injection time: 20 seconds, pressure keeping: 800 bar (80 MPa)/pressure keeping time: 10 seconds.

The mold having a surface roughness of Ra=10 nm prepared by mirror polishing (surface roughness was evaluated by a laser microscope OLS4100 (product name) manufactured by OLYMPUS) was used.

(Measurement of Glossiness) The 20° specular gloss (GS20°) of the evaluation samples obtained was measured by a glossimeter (product name: Glossimeter GM-268Plus manufactured by KONICA MINOLTA, INC., compatible specifications: ISO 2813, ISO 7668, ASTM D 523, ASTM D 2457, DIN 67 530, JIS Z 8741, BS 3900, BS 6161 (Part12)).

(Measurement of Water Absorption Rate/Evaluation of Water Resistance)

Water absorption rate was measured in accordance with JIS K7209. More specifically, a molded body was soaked in pure water of normal temperature for 24 hours and then the weight-increase rate of the molded body was measured.

The water absorption rates obtained were used as indexes for water resistance and evaluated in accordance with the following criteria.

Evaluation criteria for water resistance

○: Water absorption rate of less than 2.0% x: Water absorption rate of 2.0% or more (Measurement of Brightness)

Brightness was measured by determining the reflection of the evaluation samples obtained above in accordance with the SCE mode (regular reflection is excluded) by a spectrophotometer (product name: spectrophotometer CM-3700A, manufactured by KONICA MINOLTA, INC., in accordance with JIS Z 8722 condition c, ISO7724/1, CIE No. 15, ASTM E1164, DIN5033 Teil7). Measurement diameter/illumination diameter was SAV: 3×5 mm/5×7 mm; reflection measurement conditions were di: 8° and de: 8° (diffused illumination•8° direction light receiving); viewing field: 10°; light source: D65 light source; and UV conditions: 100% Full. The brightness herein refers to L* of CIE1976L*a*b* color space.

(4.4→4.7). When Comparative Example 6 and Comparative Example 7 using a long-chain bound cellulose are compared, it is found that the brightness of Comparative Example 7 using neutral carbon black is considerably higher

TABLE 1

| | Composition ratio (parts by mass) | | | | | | | Appearance | | Physical properties |
|---|---|---|---|---|---|---|---|---|---|---|
| | Short-chain/ long-chain/high refractive-index group bound cellulose | | Short-chain/ long-chain bound cellulose | Short-chain bound cellulose | Carbon black 1 (acidic) (particle diameter 13 nm) | Carbon black 2 (neutral) (particle diameter 13 nm) | Carbon black 3 (neutral) (particle diameter 24 nm) | Glossiness (20°) | Brightness (SCE) | Water resistance |
| | PP group | DPP group | | | | | | | | |
| Example 1 | 100 | — | — | — | — | — | — | 77 | — | ○ |
| Example 2 | 99 | — | — | — | 1 | — | — | 79 | 4.2 | ○ |
| Example 3 | 99 | — | — | — | — | 1 | — | 78 | 5.9 | ○ |
| Example 4 | — | 100 | — | — | — | — | — | 76 | — | ○ |
| Comparative Example 1 | — | — | — | 100 | — | — | — | 73 | — | X |
| Comparative Example 2 | — | — | 100 | — | — | — | — | 73 | — | ○ |
| Comparative Example 3 | — | — | — | 99 | 1 | — | — | 73 | 4.4 | X |
| Comparative Example 4 | — | — | — | 99 | — | 1 | — | 74 | 4.7 | X |
| Comparative Example 5 | — | — | — | 99 | — | — | 1 | 73 | 8.9 | X |
| Comparative Example 6 | — | — | 99 | — | 1 | — | — | 72 | 3.7 | ○ |
| Comparative Example 7 | — | — | 99 | — | — | 1 | — | 73 | 5.3 | ○ |

When Example 1 is compared to Comparative Examples 1 and 2, it is found that the molded body of Example 1 using a cellulose having a high refractive-index group bound thereto has higher glossiness than those of Comparative Examples 1 and 2 using cellulose having no high refractive-index group. Also, the cellulose derivative used in Example 1, having a long-chain organic group bound thereto, has satisfactory water resistance. Thus, according to the exemplary embodiment, it is demonstrated that a molded body having excellent water resistance and high external-appearance quality can be formed.

When Examples 2 to 3 are compared to Comparative Examples 3 to 7, it is found that the molded bodies of Examples 2 to 3 have high glossiness and satisfactory water resistance. Also, the brightness of Examples 3 using a neutral carbon is slightly high but sufficiently low compared to Comparative Example 5. Thus, according to the exemplary embodiment, it is demonstrated that a molded body having excellent water resistance and high external-appearance quality (high jet-black color) close to appearance of Japanese lacquering products can be formed.

When Example 2 is compared to Example 3, it is found that the brightness of the molded body of Example 2 using acidic carbon black is low compared to Example 3 using neutral carbon black.

It is found that difference in acidity between carbon black materials to be used influences the brightness of molded bodies, as described above. More specifically, a molded body having low brightness (high jet-black color) can be formed by using acidic carbon black.

Note that, when Comparative Example 3 and Comparative Example 4 using a short-chain bound cellulose are compared, it is found that the brightness of Comparative Example 4 using neutral carbon black is slightly higher than that of Comparative Example 3 using acidic carbon black than that of Comparative Example 6 using acidic carbon black (3.7→5.3). From this, it is demonstrated that if cellulose having a long-chain organic group bound thereto is used, acidity of carbon black influences the brightness of the resultant molded body.

When Comparative Examples 4 and 5 which are the same except the particle diameter of carbon black, are compared, it is found that Comparative Example 5 using carbon black having a larger particle diameter has considerably high brightness. Accordingly, it is demonstrated that the particle diameter of carbon black significantly influences the brightness.

In the foregoing, the present invention has been described with reference to the exemplary embodiments and the Examples; however, the present invention is not limited to the above exemplary embodiments and the Examples. Various modifications understandable to those skilled in the art may be made to the constitution and details of the present invention within the scope thereof.

The present application claims the right of priority based on Japanese Patent Application No. 2016-121282 filed on Jun. 17, 2016, and the entire disclosure of which is incorporated herein by reference.

The invention claimed is:

1. A cellulose derivative obtained by substituting at least part of hydrogen atoms of hydroxy groups of a cellulose with an acyl group having 2 to 4 carbon atoms, a long-chain organic group having 7 or more carbon atoms, and a high refractive-index organic group,
   wherein the high refractive-index organic group is an aromatic phosphoric acid ester group.

2. The cellulose derivative according to claim 1, wherein the aromatic phosphoric acid ester group is a diphenyl phosphoric acid ester group or a derivative group thereof.

3. The cellulose derivative according to claim 1, wherein the acyl group is an acetyl group or/and a propionyl group.

4. The cellulose derivative according to claim 1, wherein the long-chain organic group is a linear saturated aliphatic acyl group having 14 to 30 carbon atoms.

5. A cellulose resin composition, comprising:
a cellulose derivative obtained by substituting at least part of hydrogen atoms of hydroxy groups of a cellulose with an acyl group having 2 to 4 carbon atoms, a long-chain organic group having 7 or more carbon atoms, and a high refractive-index organic group; and
a colorant,
wherein the colorant is a carbon black,
the carbon black is an acidic carbon black having a pH value of 5 or less,
a content of the colorant relative to a total of the cellulose resin composition falls within a range of 0.05 to 10% by mass,
the high refractive-index organic group is an aromatic phosphoric acid ester group.

6. The cellulose resin composition according to claim 5, wherein an average particle diameter of the carbon black falls within a range of 1 to 20 nm.

7. The cellulose resin composition according to claim 5, optionally comprising a high refractive-index organic material, wherein a content of the high refractive-index organic material relative to 100 parts by mass of the cellulose derivative is 0 to 100 parts by mass.

8. The cellulose resin composition according to claim 7, wherein a total content of the cellulose derivative and the high refractive-index organic material relative to the amount of the cellulose resin composition excluding the colorant is 90% by mass or more.

9. A molded body formed of the cellulose resin composition according to claim 5.

10. A product using the molded body according to claim 9.

11. The cellulose resin composition according to claim 5, wherein the aromatic phosphoric acid ester group is a diphenyl phosphoric acid ester group or a derivative group thereof.

12. The cellulose resin composition according to claim 5, wherein the acyl group is an acetyl group or/and a propionyl group.

13. The cellulose resin composition according to claim 5, wherein the long-chain organic group is a linear saturated aliphatic acyl group having 14 to 30 carbon atoms.

* * * * *